United States Patent [19]

Gentry

[11] Patent Number: 4,517,717
[45] Date of Patent: May 21, 1985

[54] CRANKSHAFT INSPECTION APPARATUS AND METHOD

[76] Inventor: Elvin O. Gentry, 1419 Towanda St., Bloomington, Ill. 61701

[21] Appl. No.: 558,422

[22] Filed: Dec. 5, 1983

[51] Int. Cl.³ .............................................. B21K 1/08
[52] U.S. Cl. ....................................................... 29/6
[58] Field of Search ................................ 29/6; 72/10

[56] References Cited

U.S. PATENT DOCUMENTS

| | | | |
|---|---|---|---|
| 3,948,076 | 4/1976 | Eitel et al. | 29/6 |
| 4,030,172 | 6/1977 | Gentry | 29/6 |
| 4,272,979 | 6/1981 | Rut | 29/6 |
| 4,326,323 | 4/1982 | Kralowetz et al. | 29/6 |
| 4,416,130 | 11/1983 | Judge | 29/6 |
| 4,437,328 | 3/1984 | Wittkopp et al. | 29/6 |

FOREIGN PATENT DOCUMENTS 893955  3/1958  United Kingdom ................ 29/6

*Primary Examiner*—Howard N. Goldberg
*Assistant Examiner*—Steven Nichols
*Attorney, Agent, or Firm*—Fitch, Even, Tabin & Flannery

[57] ABSTRACT

Apparatus for inspecting a crankshaft including a pair of spaced journal portions for formation into journals and at least one throw for entering into a power transfer relationship with another mechanical component. The apparatus includes first holding means for releasably holding one of the journal portions with respect to a first predetermined position and second holding means for releasably holding the other of the journal portions with respect to a second predetermined position. The first and second predetermined positions define a line of references that will be the axis of revolution of the ultimate operating crankshaft. The apparatus further includes position detection means for providing indication of an out-of-tolerance deviation of the position of the throw from a third predetermined position. At least the first holding means includes means for moving the one journal portion relative to the first predetermined position. Finally, the apparatus includes marking means for indicating the distance the one journal portion was moved in correcting the out-of-tolerance deviation of the throw. In the preferred embodiment, the marking means includes drills for drilling holes in the end faces of the journal portions to mark the centers for turning and grinding the journals.

14 Claims, 4 Drawing Figures

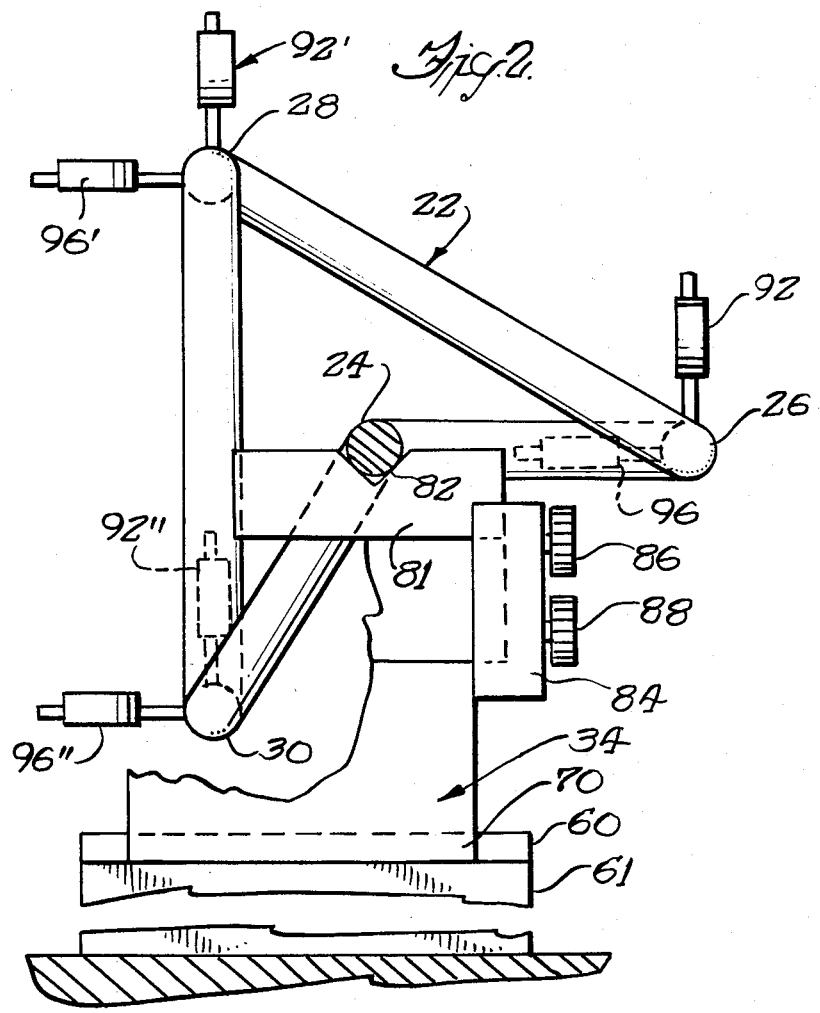
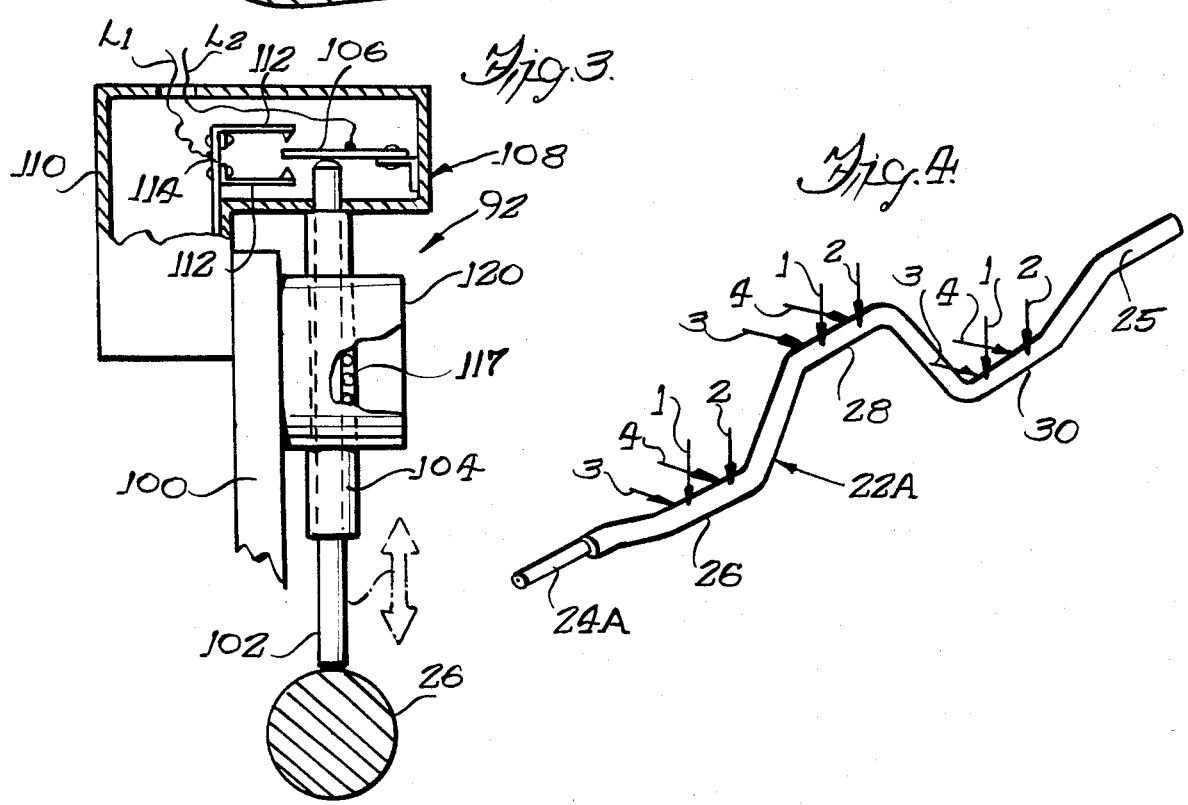

CRANKSHAFT INSPECTION APPARATUS AND METHOD

BACKGROUND OF THE INVENTION

The present invention relates generally to inspection apparatus and, more particularly, to apparatus for inspecting crankshafts to determine if the throws thereof are within tolerance with respect to the crankshaft journal and optionally for marking the journals for turning and grinding.

U.S. Pat. No. 4,030,172 is directed to apparatus and a method for forming a multiple throw crankshaft from a metal rod in a single forming operation. Such formation defines the throws or cranks of the crankshaft and may roughly form the journal portions. After formation, the journals of the crankshaft may later be defined by grinding and polishing of the journal portions.

It is possible that a crankshaft formed by such apparatus, as well as crankshafts formed by other forming method or apparatus, could be out-of-tolerance, that is, the position of a throw from the axis of the journal portions deviating from an ideal distance by more than an acceptable amount. Such an out-of-tolerance condition could be the result of operator error, a worn or otherwise defective component in the forming apparatus, as well as other causes. Also acceptable tolerances for certain types of crankshafts can be particularly stringent. For example, the throws of a finished crankshaft formed of one and one quarter inch diameter steel rod and about six feet in length, may be required to meet tolerances of plus or minus about 0.02 inches. Heretofore, out-of-tolerance crankshafts were typically discarded, or were sometimes used for other applications where looser tolerances applied.

SUMMARY OF THE INVENTION

Among the several objects of the present invention may be noted the provision of crankshaft inspection apparatus for use in detection of an out-of-tolerance crankshaft; the provision of such apparatus which indicates when compensation can be made to overcome a slightly out-of-tolerance condition; the provision of such apparatus which marks the axis of the journal to be formed to compensate for the out-of-tolerance condition; and the provision of such apparatus which is fast and reliable in use. Other objects and features of the present invention will be in part apparent and in part pointed out hereinafter in the following specification and attendant claims.

Briefly, the crankshaft inspection apparatus of the present invention includes first holding means for releasably holding one of the journal portions with respect to a predetermined first position and second holding means for releasably holding the other of the journal portions with respect to a second predetermined position, the ultimate location of the journals determining the axis of rotation of the crankshaft. The apparatus further includes position detection means for providing an out-of-tolerance indication of the position of the throw from a third predetermined position. At least the first holding means includes means for moving the one journal portion relative to the first predetermined position. The apparatus may also include means for marking the desired location of the one journal portion following any moving to correct the out-of-tolerance deviation of the throw.

BRIEF DESCRIPTION OF THE DRAWINGS

FIG. 2 is an enlarged end view of the apparatus of FIG. 1 with many components removed, illustrating a journal portion holding station and throw position detector rods;

FIG. 3 is an enlarged end view of a throw position detector with a portion removed to expose a single pole, double throw indicator switch; and FIG. 4 is a perspective view of a crankshaft, inspected by the apparatus of the present invention, in which an out-of-tolerance throw position has been compensated for by a journal ground eccentric with respect to the journal portion from which it was fabricated.

Corresponding reference characters indicate corresponding components throughout the several views of the drawings.

DESCRIPTION OF THE PREFERRED EMBODIMENT

Figure 1:
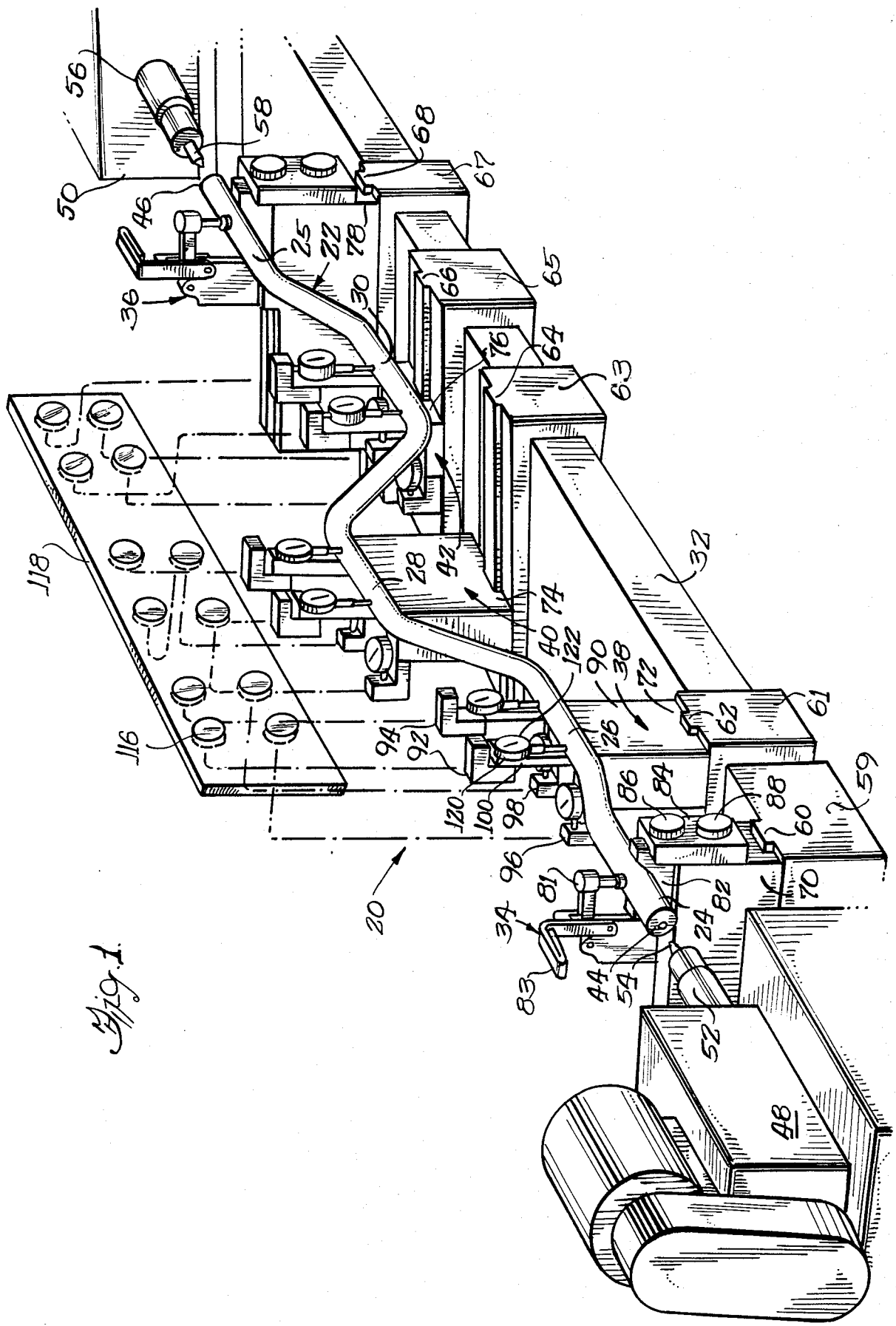
FIG. 1 is a perspective view of a preferred embodiment of inspection apparatus of the present invention for determining if a crankshaft under inspection is within tolerances.

Referring now to FIG. 1, apparatus of the present invention for inspecting a crankshaft 22 is generally indicated by reference character 20. Crankshafts may be of the type formed from a steel rod of circular cross section by apparatus utilizing the application of heat and pressure. Reference may be made to U.S. Pat. No. 4,030,142 for further information regarding the structure and operation of such crankshaft formation apparatus. Crankshaft 22, shown in FIG. 1, includes a pair of spaced journal portions 24, 25 located at the ends of the crankshaft, and a trio of throws or cranks 26, 28, 30 for entering into power transfer relationships with other mechanical components (not shown). It will be appreciated that the particular number of throws has been chosen arbitrarily for purposes of illustration. A crankshaft of the type shown could have from one to a typical maximum of six throws. After formation of the throws, fabrication of the illustrated crankshaft is completed at a finishing station by forming journals of a smaller diameter cross section from the journal portions by turning, grinding and polishing, and by adding options such as keyways at the ends of the shafts and steel rings at the center of the throws. It will be appreciated that such finished journals will be of significantly smaller diameter than the journal portions from which they are formed; however, some crankshafts which might be inspected using the illustrated apparatus may have journals of the same diameter as the rest of the rod. A crankshaft 22A is shown in FIG. 4 wherein one journal 24A has been formed from journal portion 24.

Referring to FIG. 1, apparatus 20 includes a base 32 upon which is mounted first holding means for releasably holding journal portion 24, second holding means for releasably holding journal portion 25 and position detection means for detection of the position of each throw. More specifically, the first holding means includes a first holding station 34, the second holding means includes a second holding station 36, and the position detection means comprises a portion detection station 38, 40, 42 for each crankshaft throw 26, 28, 30, respectively. Apparatus 20 also includes marking means for marking the respective ends 44, 46 of the crankshaft to identify the axis of the journal to be formed from a journal portion.

The marking means comprises drilling stations 48, 50 disposed at the respective ends of the apparatus. Drilling station 48 includes a drill 52 holding a drill bit 54 at a first predetermined position while drilling station 50 includes a drill 56 holding a bit 58 at a second predetermined position. Drilling stations 48, 50 are slidably mounted on base 32 for axial movement relative to the crankshaft under inspection with the drills 52 and 56 lying coaxial along a common line of reference to permit drilling of the crankshaft ends to mark the journal axis which will, of course, determine the axis rotation of the ultimate crankshaft.

Independently longitudinally slidably positioned on base 32 are mounts 59, 61, 63, 65, 67 having parallel tracks 60, 62, 64, 66, 68, respectively, for reception by corresponding complimentary guides 70, 72, 74, 76, 78 formed at the lower portion of each holding and detection station for guiding horizontal positioning movement of each such station along a transverse path relative to the axis of the crankshaft under inspection. Each mount and guide combination includes locking means (not shown) for locking its station in a desired location.

First holding station 34 is designed to hold journal portion 24 generally aligned with the predetermined position of the drill bit 54 of drilling station 48. Holding station 34 comprises a support 80, the lower portion of which forms guide 70 while the upper portion 81 of which carries a seat 82, such as a V-notch (FIG. 2), which receives the journal portion 24. Holding station 34 also includes clamping means for retaining journal portion 24 in seat 82, comprising a retaining arm 81 for pushing the journal portion against the seat, and a release arm 83 for moving the retaining arm between its retaining position and a release position wherein it is disposed remote from the journal portion. The first holding station 34 further comprises drive means 84 for moving the upper portion 81, the seat 82 and the clamping means, as a unit, in either of two angularly spaced directions relative to the mount 59. In the interest of brevity, details of the drive means are not shown as such drive means for work piece positioning are well known to those of skill in the art. Suffice it to say that rotation of drive means upper control knob 86 effects movement in a vertical plane of the seat 82 and journal portion 24 while operation of drive means lower control knob 88 results in movement of the seat and journal portion in a horizontal plane. Drive means 84 is preferably of limited movement in both the vertical and horizontal directions to insure that it cannot be manipulated to such an extent as to move the journal portion to a position wherein a journal which is subsequently formed as indicated by the drilled hole would fall outside the envelope or cylindrical outer-surface of the journal portion. Second holding station 36, which operates to hold journal portion 25 with respect to the predetermined position of drill bit 58 of drilling station 50, has an identical function regarding journal portion 25. Accordingly, detailed description of the second holding station is unnecessary.

Position detection stations 38, 40, 42 are essentially functionally identical; accordingly, only detection station 38 will be described in detail. Station 38, which operates to provide indication of an out-of-tolerance condition of throw 26, includes a support 90, the lower portion of which forms guide 72 for slidably receiving track 62. Mounted on the top portion of support 90 are a quartet of position detectors, two of which (92, 94) are spaced and measure the positions of portions (1, 2) of throw 26 in a vertical plane, and two of which (96, 98) measure positions of portions (3, 4) of throw 26 in a horizontal plane as best shown in FIG. 4.

Referring to FIG. 3, representative position detector 92 is held by a standard 100 mounted on support 92, and includes a feeler rod 102 captively slidably retained by a sleeve 104. The lower end of rod 102 bears on throw 26 while the upper rod end is engageable with the movable pole contact arm 106 of a single pole double throw switch 108. Switch 108 has an electrically insulative housing 110 adjustably mounted on standard 100. A pair of spaced contact arms 112 are mounted on a commoning bar 114 to flank movable pole arm 106. Leads L1, L2 are connected to bar 114 and pole arm 106 with the leads connected in series with an electrical power supply (not shown) and an indicator light 116 (FIG. 1). Thus engagement of pole arm 106 with the contact carried by either arm 112 effects energization of light 116. It will be appreciated that arm 106 is resilient and is biased, due to its formation, into engagement with the contact of lower arm 112. Additionally, rod 102 is biased by spring means 117 into engagement with throw 26.

The spacing between the contacts carried by contact arms 112 is analogous to the acceptable tolerance of throw 26. When the pole arm 106 is disposed halfway between the contact arms in FIG. 3, the vertical position of throw 26 is perfectly within tolerance. Some vertical and horizontal movement of the arms is permissible before the throw is deemed to be out-of-tolerance; however, if the vertical position of throw 26 is such to cause the pole arm to raise or drop to the extent that it makes contact with one of the arms 112, energization of light 116 provides indication of an out-of-tolerance condition. The structure and operation of a horizontal position detector, such as detector 96, is identical.

The position detection means further includes a display panel 118 having an indicator light 116 for each position detector. Each position detector is preferably provided with a position gauge 120 having an analog display 122. Gauge 120 is connected to feeler rod 102 and the display provides indication when the pole arm 106 is midway between fixed arms. Gauges 120 indicate the extent of the out-of-tolerance condition and are useful in calibration of the position detectors, as will be discussed more fully below. Moreover, comparison of the readings of gauges 92 and 94 indicate the degree of parallelism of throw 26 to a horizontal plane while comparison of the readings of gauges 96 and 98 indicate the extent of deviation of the throw from a vertical plane, either of which conditions may result in the rejection of a crankshaft.

Operation of the apparatus 20 of the present invention is as follows. Initial calibration of the position detectors is accomplished by the use of an ideal or master crankshaft. After the mounts 59, 61, 63, 65 and 67 are adjusted longitudinally on base 32 to match the positions of the journal portions and throws, and the various stations are adjusted transversely via their tracks and guides, the journal portions of this master crankshaft are installed in the two holding stations, and the positions of the two stations are adjusted to cause the seats 82 to become precisely aligned with the line of reference defined by the coaxial drill bits. Thus journal portion 24 is located at the first predetermined position while journal portion 25 is located at the second predetermined position. With the initial locations of the journal portions thus set, the dozen position detectors are adjusted, for example by moving the switch housing 110 with respect to its mounting standard 100, until the meter for each detector reads zero which indicates its pole arm is centered as shown in FIG. 3.

After completion of calibration of apparatus 20, the master crankshaft is removed, and a crankshaft 22 to be inspected has its journal positions 24, 25 loaded into holding stations 34, 36, respectively. If none of the lights is energized and the meter pairs indicate the respective throws are within acceptable parallelism to vertical and horizontal planes, the inspection apparatus of the present invention indicates the crankshaft under inspection is acceptable. The drill stations are axially advanced to drill holes in the centers of the ends of the journal portions to mark the center points for grinding, and the crankshaft is removed to the finishing station where the journals are turned and ground concentric with their respective journal portions.

Assuming one or more indicator lights 116 energizes, selective manual operation of the control knobs 86, 88 of drive means 84 of each holding station is used to try to reposition of the out-of-tolerance throw to bring it within tolerance and cause the light 116 go out. If successful, the meters are then read in pairs to see if each throw meets the test for parallelism. If one or more of the throws is not sufficiently parallel to the reference vertical and horizontal planes, as indicated by comparing the readings of the respective pairs of gauges, further adjustment of the control knobs of the drive means is made to try to bring the throws within sufficient parallelism consistent with the indicator lights 116 remaining deenergized. If both tests cannot be passed, the crankshaft is rejected; however, if both the intolerance test (as indicated by the lights being out) and the parallelism test (as indicated by comparing the gauge readings) are passed, the minor deficiencies of the crankshaft are considered to have been compensated for. Assuming both tests are satisfied, advancement of the drilling stations 48, 50 causes the drill bits to mark the ends of the journal positions thus setting the center points for grinding each of the journals. If all criteria are met, the crankshaft is removed to a finishing station where the journal portions are turned, ground and polished to form journals. The axes of the journals are defined by the drilling bores. In the illustrated version shown in FIG. 4, the journal 24A formed from journal portion 24 is slightly eccentric with respect to the axial center of the steel rod from which the journal portion is formed, by an amount equal to the distance which the drill bore was moved from the first predetermined position of holding station 34. Accordingly, the apparatus 20 of the present invention is useful in compensation for out-of-tolerance throws by formation of journals eccentric with respect to the journal portion from which the journal was formed. This can be accomplished whenever the journal portions are substantially larger in diameter than the ultimate journals so that a journal can be formed at a variety of positions as long as it lies within the envelope of its journal portion. Thus, the formation of such eccentric journals can effectively transform a crankshaft having one or more slightly out-of-position throws into an in-tolerance condition.

As a method for use in correcting a slightly out-of-tolerance crankshaft 22 having a pair of spaced journal portions 24, 25 for formation into journals 24A, 25B and at least one throw 26, the present invention comprises the following steps:

1. Identification is made of an out-of-tolerance position of throw 26 relative to a predetermined position of one journal portion 24 and a predetermined position of the other journal portion 25.

2. At least one of the journal portions is moved to cause throw 26 to come to an in-tolerance position.

3. The distance from the predetermined position to journal portion 24 to its moved position is marked, as by drilling the end face of the steel rod to set the center of the journal 4. Journal 24A is formed eccentric with respect to journal portion 24 by an amount equal to the marked distance by turning and grinding using the drilled center for reference.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for inspecting a crankshaft including a pair of spaced journal portions for formation into journals and at least one throw for entering into a power transfer relationship with another mechanical component, said apparatus comprising:
   first holding means for releasably holding one of said journal portions with respect to a first predetermined position;
   second holding means for releasably holding the other of said journal portions with respect to a second predetermined position; and
   position detection means for providing indication of out-of-tolerance deviation of the position of said throw from a third predetermined position.

2. Apparatus as set forth in claim 1 wherein said crankshaft has a plurality of throws and said apparatus comprises a position detection means for each throw.

3. Apparatus as set forth in claim 1 wherein said position detection means comprises position detectors for detecting out-of-tolerance conditions in a pair of angular spaced directions.

4. Apparatus as set forth in claim 3 wherein each detector comprises a single pole double throw switch connected serially with a power supply and an indicator light, the pole contact arm of said switch being engageable with a slidable rod for bearing on said throw.

5. Apparatus as set forth in claim 1 wherein said journal portions are at the ends of said crankshaft.

6. Apparatus for inspecting a crankshaft including a pair of spaced journal portions for formation into journals and at least one throw for entering into a power transfer relationship with another mechanical component, said apparatus comprising:
   first holding means for releasably holding one of said journal portions with respect to a first predetermined position;
   second holding means for releasably holding the other of said journal portions with respect to a second predetermined position;
   position detection means for providing indication of out-of-tolerance deviation of the position of said throw from a third predetermined position, at least said first holding comprising means for moving said one journal portion relative to said first predetermined position; and marking means for marking the distance of the moved position of said one journal portion from its predetermined position when said one journal portion has been moved sufficiently to cause said detection means to cease out-of-tolerance indication whereby formation of the one journal eccentric relative to the journal portion from which it was formed by said marked distance causes the completed crankshaft to be within tolerance.

7. Apparatus as set forth in claim 6 wherein each of said holding means comprises means for moving its journal portion in a pair of angularly spaced directions.

8. Apparatus as set forth in claim 6 wherein said crankshaft has a plurality of throws and said apparatus comprises a position detection means for each throw.

9. Apparatus as set forth in claim 6 wherein said position detection means comprises position detectors for detecting out-of-tolerance conditions in a pair of angular spaced directions.

10. Apparatus as set forth in claim 9 wherein each detector comprises a single pole double throw switch connected serially with a power supply and an indicator light, the pole contact arm of said switch being engageable with a slidable rod for bearing on said throw.

11. Apparatus as set forth in claim 6 wherein said marking means comprises drill means including a drill bit aligned axially with said one journal portion when in its predetermined portion, said drill means being axially movable.

12. Apparatus as set forth in claim 11 wherein said one journal portion is at an end of said crankshaft.

13. A method for correcting an out-of-tolerance crankshaft formed from a steel rod or the like having a pair of spaced journal portions for formation into journals of smaller diameter and at least one throw for entering into a power transfer relationship with another mechanical component, said method comprising the following steps:

identifying an out-of-tolerance position of said throw relative to a predetermined position of one journal portion and a predetermined position of the other journal portion;

moving at least one of said journal portions to cause said throw to come to an in-tolerance position;

marking the distance from the predetermined position of said one journal portion to its moved position; and forming one journal eccentric with respect to the centerline of the steel rod by the marked distance.

14. The method of claim 13 wherein said marking is effected by drilling a hole in the end face of said steel rod at a locaton that marks the centerline of the desired journal to be formed.

* * * * *